United States Patent
Brenner et al.

(10) Patent No.: US 6,740,697 B1
(45) Date of Patent: May 25, 2004

(54) FLAME-RESISTANT THERMOPLASTIC MOLDING MATERIAL

(75) Inventors: Axel Brenner, Düsseldorf (DE); Walter Köhler, Duisburg (DE); Martin Döbler, Düsseldorf (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/913,760

(22) PCT Filed: Feb. 11, 2000

(86) PCT No.: PCT/EP00/01117

§ 371 (c)(1), (2), (4) Date: Aug. 17, 2001

(87) PCT Pub. No.: WO00/50511

PCT Pub. Date: Aug. 31, 2000

(30) Foreign Application Priority Data

Feb. 24, 1999 (DE) .......................... 199 07 831

(51) Int. Cl.⁷ ..................... C08K 5/42; C08K 3/30; C08K 3/22

(52) U.S. Cl. .................. 524/166; 524/161; 524/162; 524/423; 524/430; 524/431; 524/432; 524/433; 524/492; 524/497

(58) Field of Search .................. 524/161–162, 524/166, 423, 430–433, 492, 497

(56) References Cited

U.S. PATENT DOCUMENTS

| | | | | |
|---|---|---|---|---|
| 3,919,167 A | * | 11/1975 | Mark ........................... | 524/84 |
| 3,926,908 A | | 12/1975 | Mark ........................... | 260/45.7 S |
| 3,933,734 A | * | 1/1976 | Mark et al. .................. | 524/160 |
| 3,940,366 A | | 2/1976 | Mark ........................... | 260/45.9 R |
| 3,953,399 A | | 4/1976 | Mark ........................... | 260/45.85 H |
| 4,104,246 A | | 8/1978 | Mark ........................... | 260/45.7 S |
| 4,239,678 A | | 12/1980 | Williams ..................... | 260/42.18 |
| 4,495,111 A | | 1/1985 | Guerin et al. ............... | 260/932 |
| 4,650,823 A | * | 3/1987 | Krishnan et al. ........... | 524/431 |
| 4,713,408 A | * | 12/1987 | Takahashi et al. .......... | 524/161 |
| 4,727,101 A | | 2/1988 | Ogoe et al. .................. | 524/83 |
| 4,970,249 A | | 11/1990 | Joswig et al. ................ | 524/125 |
| 4,988,748 A | | 1/1991 | Fuhr et al. ................... | 524/141 |
| 5,204,394 A | | 4/1993 | Gosens et al. ............... | 524/125 |
| 5,356,965 A | | 10/1994 | Weider et al. ................ | 524/108 |
| 5,449,710 A | | 9/1995 | Umeda et al. ................ | 524/165 |
| 5,849,001 A | * | 12/1998 | Torimae et al. .............. | 604/372 |
| RE36,188 E | | 4/1999 | Gosen et al. ................. | 524/125 |
| 5,910,560 A | * | 6/1999 | Nagashima et al. ......... | 528/196 |
| 6,369,141 B1 | * | 4/2002 | Ishii et al. .................... | 524/127 |

FOREIGN PATENT DOCUMENTS

| | | |
|---|---|---|
| DE | 43 30 375 | 3/1995 |
| DE | 197 34 666 | 2/1999 |
| EP | 0 335 159 | 10/1989 |
| EP | 0 531 861 | 3/1993 |

OTHER PUBLICATIONS

Database WPI, Section Ch, Week 199503, Derwent Publications Ltd., London, GB; AN 1995–019421, XP002137102 and JP 06 306268 A (Idemitsu Petrochem Co), Nov. 1, 1994.

Database WPI, Section Ch, Week 199145, Derwent Publications Ltd., London, GB; AN 1991–329261, XP002137103, and JP 03 220253 A (Lion Corp.), Sep. 27, 1991.

* cited by examiner

*Primary Examiner*—Peter Szekely
(74) *Attorney, Agent, or Firm*—Joseph C. Gil; Aron Preis; James R. Franks

(57) ABSTRACT

A flame retardant thermoplastic molding composition is disclosed. The composition contains an amorphous thermoplastic polymer, at least one flame retardant in the form of a fully or partially halogenated sulfonic acid salt and at least on alkaline earth metal sulfate and/or one oxide having an average particle size of up to 400 nm.

15 Claims, No Drawings

FLAME-RESISTANT THERMOPLASTIC MOLDING MATERIAL

The invention relates to a flame-resistant thermoplastic moulding composition which comprises an amorphous thermoplastic polymer and a flame retardant, and flame-resistant moulded bodies produced therefrom.

The flame behaviour of amorphous thermoplastics such as polycarbonates plays an important role in particular in areas in which compliance with specific fire safety regulations is a requirement, such as in the electrical, automotive, construction and to aeronautical sectors. UL-94, the Underwriters Laboratories flammability test (Underwriters Laboratories, Northbrook, Ill., USA) which considers both the burning duration of the plastic following flame impingement and also the tendency to drip burning material, is the standard frequently applied to flammability of solid plastics. In accordance with the UL-94 regulation a flame impinges under specified conditions on plastic samples of variable thickness measuring 12.7×1.27 cm, and the burning duration is determined. The samples are classified into UL-94 flammability classes V0, V1 and V2, in order of decreasing flame resistance. In order to be classified into UL-94 flammability class V0 a sample must not exceed a specified burning duration, amid additionally a surgical cotton wad located beneath the sample must not be ignited by dripping burning particles.

Flame retardants are utilised for the preparation of flame-resistant amorphous thermoplastics such as polycarbonates. They are generally known and are described, for example, in B. J. Sutker "Flame Retardants", Ullmann's Encyclopedia of Industrial Chemistry, 6th edition, 1998.

There is a need for mouldings made of flame-resistant amorphous thermoplastics, which meet the requirements of UL-94 flammability class V0 even at relatively low wall thicknesses. Thus in the case of electrical equipment weight savings can be achieved by the use of polycarbonate housings having the thinnest possible walls, for instance. There is furthermore a need for thin-walled mouldings of amorphous thermoplastics which in addition to having excellent flame retardant properties are transparent. Transparent polycarbonate mouldings have a role in, for instance, housings and covering plates for electrical equipment as well as in the construction sector for sheets, windows and claddings of widely varying types.

EP 0 531 861 A1 discloses the equipping of polycarbonates with a halogen-free sulfonic acid salt of aromatic aldehydes or acetal derivatives thereof, optionally in combination with inorganic sulfates such as sodium or potassium sulfate as fire retardants. The use of these fire retardants enables UL-94 flammability class V0 to be achieved for 3.2 mm-thick polycarbonate test specimens. Test specimens having a lesser thickness do not achieve UL-94 flammability class V0.

BP 0 362 623 A2 further discloses flame-retarded polyethylene terephthalate moulding compositions achieving good crystallisation, which comprise from 1 to 25 wt. % polyalkyl phosphonates as flame retardants as well as from 0.01 to 10 wt. % ultra-fine barium sulfate in combination with from 0.01 to 5 wt. % fluorinated polyolefins as crystallisation promoters. The fluorinated polyolefin content enables only cloudy mouldings to be produced from the polyethylene terephthalate moulding compositions described.

A disadvantage of the known flame retardants is that UL-94 flammability class V0can be achieved in respect of polycarbonate only at moulding wall thicknesses of 3.2 mm or more. The known flame retardants furthermore tend to cloud the thermoplastic moulding compositions and/or they are subject to frequent fluctuations in their flame-retardant effect. A further disadvantage is the frequent marked impairment, caused by the recycling process, of the flame-retardant effect of mouldings equipped with known flame retardants. Mouldings processed by shredding and re-extrusion of scrap to form recycled mouldings therefore frequently have a substantially poorer flame behaviour than the original mouldings. What is more, a range of known flame retardants are sensitive to compromising of their effectiveness by the presence of mould release agents such as glycerol monostearate (GMS) or pentaerythritol tetrastearate (PETS). Known flame retardants frequently require the use of additional transesterification catalysts in order to deploy their effect, potentially leading to undesirable changes in the properties of the plastic.

The object of the invention is to provide amorphous thermoplastic moulding compositions, in particular those such as are of polycarbonate, having improved flame behaviour. The moulding compositions should still achieve UL-94 flammability class V0 even at wall thicknesses of less than 3.2 mm. This should occur if possible with no deterioration in the transparency and mechanical properties of the moulding compositions. The moulding compositions should furthermore also still afford the desired flame retardancy as a recycled product. The flame retardancy should not furthermore be impaired by the use of mould release agents such as GMS or PETS. The moulding compositions should furthermore be preparable without the use of additional transesterification catalysts which lead to undesirable changes in the properties.

This object is achieved according to the invention by a thermoplastic moulding composition which comprises an amorphous thermoplastic polymer and a flame retardant in combination with an alkaline earth metal sulfate and/or an oxide having di each case an average particle size of up to 400 nm. The alkaline earth al sulfates and oxides used according to the invention having an average particle size of up to 400 nm are also designated hereinbelow "nanoparticulate" or "ultra-fine" alkaline earth metal sulfates and oxides.

The moulding composition which comprises an amorphous thermoplastic polymer in particular includes as a flame retardant a mixture of a known flame retardant selected from among sulfonic acid salts, sulfonamide acid salts, organic phosphates and salts thereof, halogenated benzoic acid ester salts and hexafluoroaluminates and an alkaline earth metal sulfate and/or an oxide having in each case an average particle size of up to 400 nm.

According to an embodiment of the invention the moulding composition according to the invention further comprises a fluorinated hydrocarbon such as polytetrafluoroethylene.

It was here, surprisingly found that flame-resistant thermoplastic moulding compositions having an extremely favourable property profile can be prepared by the addition of nanoparticulate alkaline earth metal sulfates and/or oxides in addition to the known flame retardants. The mouldings according to the invention thus still achieve UL-94 flammability class V0 even at a wall thickness of 0.8 mm and, at a thickness of up to 2.8 mm, pass the Underwriters Laboratories UL-94 5V bar test The use of nanoparticulate alkaline earth metal sulfates and/or oxides enables the quantity of known flame retardants which is required in order to achieve a specified flame-retardant effect to be reduced. This means that less flame retardant needs to be utilised as a result of the utilisation of nanoparticulate alkaline earth metal sulfates and/or oxides, with the same flame-retardant effect.

The addition of nanoparticulate alkaline earth metal sulfates and/or nanoparticulate oxides is able to improve markedly the flame-retardant effect of known flame retardants despite neither of the compound classes first named having alone any flame-retardant effect. This means that the combination of known flame retardant and nanoparticulate alkaline earth metal sulfatestoxides deploys a synergistic effect with respect to the flame-retardant properties of the thermoplastic moulding compositions.

The mechanical properties of the thermoplastic moulding compositions according to the invention are not influenced disadvantageously by the presence of nanoparticulate alkaline earth metal sulfates and/or oxides and are good even after recycling of the moulding compositions. Thus the moulding compositions according to the invention are distinguished, both before and after recycling, by a high notched impact strength in accordance with ISO 180-4a, for example.

An essential advantage of the invention resides furthermore in the ability of the mouldings also to be produced as highly transparent mouldings. This has significance in particular in the case of plastic mouldings such as plastic windows, which are used in the construction sector, as well as in the case of housings and covering plates for electrical equipment. UL-94 flammability class V0 can be achieved in respect of the transparent mouldings according to the invention at a wall thickness of up to 2.4 mm. Furthermore, regenerated products from mouldings equipped with the additives described herein still have a high flame resistance and a low tendency to drip burning material.

In moulding compositions destined for the production of transparent mouldings, the alkaline earth metal sulfates and/or oxides preferably have an average particle size of less than approximately 100 nm, still more preferably approximately 5 to 40 nm. The particle size can be determined by ultra-centrifuging as reported by Langer, H. "Particle and Particle Size Characterization", Vol. 12, p. 148, 1995, for example.

Alkaline earth metal sulfates which are utilisable according to the invention are, for example, magnesium sulfate, calcium sulfate, strontium sulfate and barium sulfate. Mixtures of different alkaline earth metal sulfates may also be utilised.

According to a particularly preferred embodiment of the invention nanoparticulate barium sulfate is used. This may, as described in EP 335 159 A1, for example, be prepared by combining separate aqueous solutions which comprise respectively equimolar quantities of barium ions and sulfate ions, for instance as a result of combining equimolar solutions of barium chloride and sodium sulfate, followed by separation of the precipitate. In order to obtain a primary grain size of less than 0.1 μm, the respective aqueous solutions are brought together rapidly in continuous manner, in each case in drop form having an average drop size of less than approximately 0.5 μl, and the precipitation is induced in rapid and complete manner in a total volume of less than approximately 1 μl.

All oxides which are preparable having an average particle size of up to approximately 400 nm may be used as the oxides. These are in particular those such as belong to groups 2b, 3a, 3b, 4a, 4b and 8b of the Periodic Table as well as oxides of the lanthanides and actinides. Oxides which are preferred according to the invention are $GeO_2$, $PbO$, $PbO_2$, $CeO_2$, $Ce_2O_3$, $SnO$, $SnO_2$, $ZnO$, $TiO_2$, $SiO_2$, $ZrO_2$, $HfO_2$, $Al_2O_3$, $Sc_2O_3$, $La_2O_3$ and $Fe_2O_3$. Mixtures of different oxides may also be utilised.

The quantity of alkaline earth metal sulfates and/or oxides in the moulding composition may be varied within broad limits. However, at above 10 wt. %, in relation to the total weight of the moulding composition, undesirable changes occur in the physical properties of the moulding compositions, while when additive quantities are less than 0.0005 wt. % no appreciable flame retardancy-reinforcing effect takes place. Since the flame retardancy-reinforcing effect is already achieved is at very low additive quantities, the alkine earth metal sulfates and/or oxides are preferably utilised in quantities of from 0.001 to 5.0 wt. %, and even more preferably from 0.01 to 2.0 wt. %, in relation to the total weight of the moulding composition.

The synergistic effect of the nanoparticulate alkaline earth metal sulfates and/or oxides with respect to the flame-retardant properties of the moulding compositions occurs in combination with numerous known flame retardants. These include both halogen-containing and also halogen-free compounds. Suitable halo compounds are organic fluorine, chlorine and/or bromine compounds which are stable during the preparation and processing of the moulding compositions according to the invention, such that no corrosive gases are liberated and their effectiveness is not impaired. Mixtures of known flame retardants may also be utilised.

The quantity of the flame retardants utilised may be varied within broad limits and is strongly dependent on the desired flame-retardant properties of the plastic and on the type of flame retardant used. Preferably from 0.001 to 5.0 wt. %, in particular 0.05 to 0.5 wt. % flame retardant, in relation to the total weight of the moulding composition, is utilised.

Flame retardants which are particularly preferred according to the invention are sulfonic acid salts, sulfonic acid amide salts, organic phosphates and salts thereof, halogenated benzoic acid ester salts and/or hexafluoroaluminates.

Sulfonic acid salts which are particularly suitable are those corresponding to the general formula (I)

$$[R-SO_3]_n^- M^{n+} \qquad (I)$$

in which

R is a straight-chain or branched aliphatic radical having 1 to 30 carbon atoms or an aromatic radical having 6 to 30 carbon atoms which may be fully or partially halogenated, M is any cation, and n is a number corresponding to the valency of M.

These are described, for instance, in U.S. Pat. No. 4,239,678. Fully or partially fluorinated sulfonic acid salts corresponding to the general formula (I) are particularly preferred Sodium or potassium perfluorobutane sulfonate, sodium or potassium perfluoromethane sulfonate, sodium- or potassium-2,5-dichlorobenzene sulfonate, sodium- or potassium-2,4,5-trichlorobenzene sulfonate, sodium or potassium. diphenylsulfone sulfonate and sodium- or potassium-2-formylbenzene sulfonate might be named by way of example. According to a particularly preferred embodiment of the invention potassium perfluorobutane sulfonate is utilised as a flame retardant.

Particularly suitable flame retardants are furthermore the sulfonic acid amide salts described in U.S. Pat. No. 4,727, 101, corresponding to the general formula (II)

$$(Ar-SO_2-NR)_n^- M^{n+} \quad (II)$$

in which

Ar is an aromatic radical and R is a monovalent aliphatic radical, or

Ar and R together form a bivalent aromatic radical,

M is any cation, and n corresponds to the valency of M.

Particularly preferred sulfonic acid amide salts are sodium and potassium(N-benzenesulfonyl) benzene sulfonamide.

Aromatic sulfonic acid salts are furthermore considered as flame retardants. These are in particular the metal salts of monomeric or polymeric aromatic sulfonic acids, as described in U.S. Pat. No. 3,940,366 and U.S. Pat. No. 3,933,734 and the sulfonic acid salts of monomeric and polymeric aromatic carboxylic acids and esters thereof, as disclosed in U.S. Pat. No. 3,953,399, as well as the sulfonic acid salts of aromatic ketones, as described in U.S. Pat. No. 3,926,908 and U.S. Pat. No. 4,104,246.

Particularly suitable aromatic sulfonic acid salts are furthermore the halogen-free sulfonic acid salts of aromatic aldehydes or acetals thereof, as described in U.S. Pat. No. 5,356,965. These are in particular those such as correspond to the general formula (III):

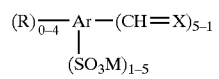

$$(R)_{0-4}-Ar-(CH=X)_{5-1}$$
$$|$$
$$(SO_3M)_{1-5}$$

in which

Ar is an aromatic radical having 1 to 4 aromatic rings,

M stands for a metal from groups 1a, 1b, 2a or 2b of the Periodic Table of Elements, R is hydrogen, a halogen-free $C_1$–$C_6$-alkyl, a halogen-free $C_6$–$C_{10}$-aryl, a halogen-free $C_1$–$C_6$-alkoxy, a halogen-free acylamino group or a halogen-free acylimino group, and X stands for oxygen or a halogen-free polyvalent group having the structure R'—(—O—)$_{2-6}$ or for two halogen-free monovalent R'—O-radicals, wherein R' is an optionally branched, halogen-free $C_2$–$C_{20}$-alkyl or -alkylene, halogen-free $C_5$–$C_{10}$-aryl or -arylene or halogen-free $C_7$–$C_{20}$-aralkyl or -aralkylene radical, which optionally links a plurality of structural units The sulfonic acid salts according to the invention are derived from aromatic sulfonic acids which carry aldehyde groups, which are readily prepared by known methods, for example from the base aldehydes by sulfonation, from aromatic haloaldehydes by exchanging the halogen for the sulfonate group or from the sulfonates by formylation. The flame-retardant effect is exerted both by the aldehydes themselves and also by their acetal derivatives which are obtainable by acid-catalysed reaction with alcohols or phenols with separation of water. When monoalcohols are used the acyclic acetates having two radicals R' per aldehyde group arise; from diols or orthodiphenols the simple cyclic acetates arise; when tri- or tetraalcohols or tri- or tetraphenols are used, two aldehyde groups are in each case linked together by way of the alcohol radical or phenol radical. If more than one aldehyde group is comprised in the aromatic sulfonate, or more than two hydroxy groups are comprised in the alcohol or phenol used for the acetalisation, the corresponding acetates may also be oligomeric or polymeric in type.

For example, the following compounds may be utilised in the form of their metal salts as aldehyde group-containing sulfonates: 2-formylbenzenesulfonic acid, 3-formylbenzenesulfonic acid, 4-formylbenzenesulfonic acid, 5-formyl-2-methylbenzenesulfonic acid, 5-formyl-2-methoxybenzenesulfonic acid, 5-formyl-2-hexadecyloxybenzenesulfonic acid, 2-formylbenzene-1,5-disulfonic acid, 2,4-diformylbenzenesulfonic acid, 2-formyl-5-phenylbenzenesulfonic acid, biphenyl-4'-formyl-4-sulfonic acid, biphenyl-4,4'-bis-formyl-2,2'-disulfonic acid, 2-formyl-5-phenylbenzenesulfonic acid, biphenyl-4'-formyl-4-sulfonic acid, biphenyl-4,4'-bis-formyl-2,2'-disulfonic acid, 2-formyl-5-(acetylamino) benzenesulfonic acid or 2-formyl-5-(phthalimino) benzenesulfonic acid, or acetates thereof which are obtainable, for example, by reacting the aforementioned aldehydes with the following hydroxy compounds: methanol ethanol, n-propanol, n-butanol, isobutyl alcohol, isopentyl alcohol, 2-ethylhexanol, benzyl alcohol, 2-phenylethanol, 3-phenyl-1-propanol, ethylene glycol, propylene glycol, 1,3-propanediol, 1,2-butylene glycol, 1,3-butanediol, 2,3-butanediol, neopentyl glycol, 2,5-hexanediol, 2-methyl-2-propyl-1,3-propanediol, 2,2-diethyl-1,3-propanediol, glycerol, 2-hydroxymethyl-2-methyl-1,3-propanediol, 1,1,1-trimethylolpropane, pentaerythritol, sorbitol, mannitol, 1,2-cyclohexanediol, 1,4-cyclohexane dimethanol, bis-hydroxymethyl-hexahydro-4,7-methanoindane, catechol, 1,4-bis(2-hydroxyethoxy)benzene, 4-tert-butylcatechol, 2,3-naphthalenediol, 1,8-naphthalenediol, 2,2'-dihydroxybiphenyl, 3,4-dihydroxybiphenyl, 2,2-bis(4-hydroxyphenyl)propane, 2,2-bis(4-(2-hydroxyethoxyphenyl)propane or 2,2-bis(4-(2,3-dihydroxypropoxy)phenyl)propane, glycerol-1-phenylether, glycerol-1-(nonylphenyl)ether, glycerol-1-(p-cumylphenyl) ether, 2,2-bis(4-(2,3-dihydroxypropoxy)phenyl)propane and stearyl alcohol.

The metal cation of the sulfonates may come from groups 1a,b or 2a,b of the Periodic Table. In particular lithium, sodium, potassium, magnesium, calcium and zinc are considered. Alkali metals and alkaline earth metals are preferred.

The sulfonic acid salts content according to the invention of the thermoplastic moulding composition may be varied within broad limits. However, at above 10 wt. % undesirable changes occur in the physical properties of the moulding composition, while the flame-retardant effect is lost at additive quantities of less than 0.005 wt. %. Because the flame-retardant effect is already achieved with very low additive quantities, the sulfonic acid salts according to the invention are preferably added in quantities of between 5 and 0.01 wt. %.

All phosphorus compounds conventionally used for this purpose, in particular phosphine oxides and derivatives of acids of phosphorus and salts of acids and acid derivatives of phosphorus, are likewise preferably suitable as the flame retardant.

Derivatives (for example esters) of acids of phosphorus and salts thereof are: preferably utilised, with acids of phosphorus including phosphoric acid, phosphonic acid, phosphinic acid, phosphorous acid, including in each case in dehydrated form, salts are preferably alkali metal, alkaline earth metal and ammonium salts of these acids, and derivatives thereof (for example partially esterified acids) are also included.

Phosphoric acid ester salts corresponding to the general formula (IV)

$$PO(OM)_a(OR)_b \qquad (IV)$$

in which

M is any metal,

R is a straight-chain or branched aliphatic radical having 1 to 30 carbon atoms or an aromatic radical having 6 to 30 carbon atoms, in which the hydrogen atoms may be fully or partially halogenated, and a+b=3, are furthermore particularly suitable.

Preferred examples of such compounds are sodium or potassium methyl phosphonate, sodium or potassium-(2-phenylethylene) phosphonate and lithium phenyl phosphonate.

Further preferred organic phosphorus compounds are the phosphoric acid semiesters described in U.S. Pat. No. 4,495,111.

Preferred organic phosphorus compounds are furthermore those such as correspond to the general formula (V)

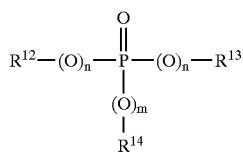

(V)

in which $R^{12}$, $R^{13}$ and $R^{14}$ are independently of one another an optionally halogenated $C_1$–$C_8$-alkyl or an optionally halogenated and/or alkylated $C_5$- or $C_6$-cycloalkyl or an optionally halogenated and/or alkylated and/or aralkylated $C_6$–$C_{30}$-aryl, and N and M are independently of one another 0 or 1.

These phosphorus compounds are generally known and are described, for example, in Ullmann, "Enzykloptädie der technischen Chemie" [Encyclopedia of Industrial Chemistry], Vol. 18, pp. 301 et seq., 1979. The aralkylated phosphorus compounds are described, for example, in DE-OS 38 24 356.

The optionally halogenated and/or alylated and/or aralkylated $C_6$–$C_{30}$-aryl radicals in the formula (V) are optionally mono- or polynuclear, have single or multiple halogenation and/or alkylation and/or aralkylation, for example chlorophenyl, bromophenyl, pentachlorophenyl, pentabromophenyl, phenyl, cresyl, isopropylphenyl, benzyl-substituted phenyl and naphthyl.

Phosphorus compounds corresponding to the formula (V) which are utilisable according to the invention are, for example, tributyl phosphate, tris(2-chloroethyl)phosphate, tris(2,3dibromopropyl)phosphate, triphenyl phosphate, tricresyl phosphate, diphenylcresyl phosphate, diphenyloctyl phosphate, diphenyl-2-ethylcresyl phosphate, tri-(isopropylphenyl)phosphate, tris(p-benzylphenyl) phosphate, triphenyl phosphine oxide, methanephosphonic acid dimethyl ester, methanephosphonic acid diphenyl ester and phenylphosphonic acid diethyl ester.

Suitable flame retardants are furthermore the oligomeric phosphorus compounds described in EP 0 363 608 which correspond to the formula (V1)

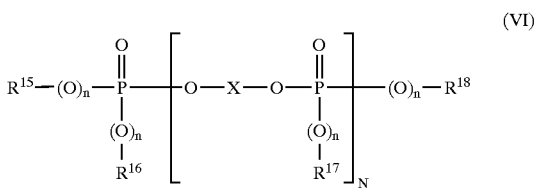

(VI)

in which $R^{15}$, $R^{16}$, $R^{17}$, $R^{18}$ denote independently of one another $C_1$–$C_{18}$-alkyl, preferably methyl, $C_5$–$C_6$-cycloalkyl, $C_6$–$C_{10}$-aryl, preferably phenyl, $C_7$–$C_{12}$-aralkyl, preferably phenyl-$C_1$–$C_4$-alkyl, n denotes independently of one another 0 or 1, N denotes 1 to 5, and X denotes a mono- or polynuclear aromatic radical having 6 to 30 C atom, preferably derived from bisphenol A, hydroquinone or resorcinol.

The molecular weight of the phosphorus compounds corresponding to the formula (VI) is generally less than 2000 g/mol, preferably less than 1000 g/mol.

The optionally halogenated $C_1$–$C_8$-alkyl radicals in the formulae (V) and (VI) may have single or multiple halogenation and may be linear or branched. Examples of alkyl radicals are chloroethyl, 2-chloropropyl, 2,3-dibromopropyl, butyl, methyl or octyl.

The optionally halogenated and/or alkylated $C_5$- or $C_6$-cycloalkyl radicals in the formulae (V) and (VI) are $C_5$- or $C_6$-cycloaklyl radicals which optionally have single to multiple halogenation and/or alkylation, such as cyclopentyl, cyclohexyl, 3,3,3-trimethylcyclohexyl and perchlorocyclohexyl.

In the case of mixtures of a plurality of phosphates corresponding to the formula (VI), N represents an average value between 1 and 5. Preferred flame retardants are also mixtures of phosphorus compounds corresponding to the formula (V) and phosphorus compounds corresponding to the formula (VI).

Suitable flame retardants are furthermore halogenated benzoic acid salts such as sodium or potassium pentachlorobenzoate, sodium- or potassium-2,4,6-trichlorobenzoate and sodium- or potassium-2,4-dichlorobenzoate as well as hexafluoroaluminates such as sodium or potassium hexafluoroantimonate.

Moreover, halogen-containing flame retardants such as chlorinated and brominated diphenyls such as octachlorodiphenyl, decachlorodiphenyl, octabromodiphenyl, decabromodiphenyl; chlorinated and brominated diphenyl ethers such as octa- and decachlorodiphenyl ether and octa- and decabromodiphenyl ether, chlorinated and brominated phthalic anhydride and derivatives thereof, such as phthalimides and bisphthalimides, for example tetrachloro- and tetrabromophthalic anhydride, tetrachloro- and tetrabromopththalimide, N,N'-ethylene-bistetrachloro- and N,N'-ethylene-bistetrabromophthalmide, N-methyltetrachloro- and N-methyltetrabromophthalimide; chlorinated and brominated bisphenols such as 2,2-bis(3,5-dichloro-4-hydroxyphenyl)propane and 2,2bis(3,5-dibromo-4-hydroxyphenyl)propane; 2,2-bis(3,5-dichloro-4-hydroxyphenyl)propane and 2,2-bis(3,5-dichloro-4-hydroxyphenyl)propane oligocarbonate having an average degree of polycondensation ($M_n$) of from 2 to 20 may. Bromine compounds are preferred to chlorine compounds.

The moulding compositions may additionally comprise fluorinated hydrocarbons, in particular fluorinated polyolefins, in the case of specific flame retardancy requirements. It has been ascertained according to the invention that these when combined with nanoparticulate alkaline earth metal sulfates and/or nanoparticulate oxides and known flame retardants deploy a synergistic effect with respect to the flame-retardant properties of the thermoplastic moulding compositions. The fluorinated polyolefins which are usable have high molecular weights and glass transition temperatures greater than −30° C., generally greater than 100° C. The fluorine contents of the fluorinated polyolefins are preferably from 65 to 76 wt. %, in particular 70 to 76 wt. %. The average particle diameter $d_{,o}$ of the fluorinated polyolefins is from 0.05 to 1000 $\mu$m, preferably 0.08 to 20 $\mu$m. The density of the fluorinated polyolefins is generally from 1.2 to 2.3 $g/cm^3$. Preferred fluorinated polyolefins are polytetrafluoroethylene, polyvinylidene fluoride, tetrafluoroethylene-hexafluoropropylene copolymer and ethylene/tetrafluoroethylene copolymer. Such fluorinated polyolefins are described, for example, in Schildknecht "Vinyl-und Related Polymer" [Vinyl and Related Polymers], John Wiley & Sons, Inc., New York, 1962, pp. 284–494; Wall "Fluoropolymers", Wiley-Interscience, John Wiley & Sons, Inc., New York, Vol. 13, 1970, pp 623–654; "Modern Plastics Encyclopedia", 1970–1971, Vol. 47, No. 10 A, October 1970, McGraw-Hill, Inc., New York, pp. 134 and 774; "Modern Plastics Encyclopedia", 1975–1976, October 1975, Vol. 52, No. 10 A. McGraw-Hill, Inc., New York, pp, 27, 28 and 472 as well as in U.S. Pat. No. 3,671,487, U.S. Pat. No. 3,723,373 and U.S. Pat. No. 3,838,092.

The quantity of the fluorinated hydrocarbons to be utilised in the thermoplastic moulding composition is dependent on the desired material properties and may be varied within broad limits. The quantity of the fluorinated polyolefins is preferably from 0.001 to 0.5 wt. %, in particular 0.01 to 0.1 wt. %, in relation to the total weight of the moulding composition.

According to a particularly advantageous embodiment of the invention polytetrafluoroethylene is utilised as the fluoridated hydrocarbon. A particularly good flame retardancy behaviour of the moulding composition is obtained with no deterioration of the other material properties when polytetrafluoroethylene is utilised in a quantity of from 0.001 to 0.5 wt. %, in particular 0.01 to 0.1 wt. %, in relation to the total weight of the moulding composition.

Amorphous thermoplastic polymers within the meaning of this invention are all amorphous thermoplastics, in particular amorphous polyesters and amorphous polyolefins as well as in each case, copolymers and polymer blends thereof. Amorphous polyesters to be utilised according to the invention are in particular polycarbonates. Amorphous polyolefins include both open-chain polyolefins such as polypropylene and amorphous polystyrenes as well as cycloolefin polymers.

According to a particularly preferred embodiment of the invention polycarbonates are utilised as the polymers. Polycarbonates which are suitable according to the invention are both homopolycarbonates and also copolycarbonates. A mixture of the polycarbonates which are suitable according to the invention may also be used. The polycarbonates may be replaced partially or completely by aromatic polyester carbonates. The polycarbonates may also comprise polysiloxane blocks. Their preparation is described, for example, in U.S. Pat. No. 3,821,325, U.S. Pat. No. 3,189,662 and U.S. Pat. No. 3,832,419. Other polymers may be admixed to the polycarbonates, thus obtaining so-called polymer blends. For example, blends may be prepared from the polycarbonates equipped according to the invention and ABS polymers or from the polycarbonates equipped according to the invention to be flame-resistant and polyesters such as polyethylene terephthalate or polybutylene terephthalate.

The thermoplastic polycarbonates which are to be equipped according to the invention to be flame-resistant have average molecular weights $\overline{M}_w$ of 10,000 to 200,000 g/mol, preferably 15,000 to 45,000 g/mol, still more preferably 18,000 to 35,000 g/mol, determined by measuring the relative viscosity at 25° C. in $CH_2Cl_2$ and at a concentration of 0.5 g per 100 ml $CH_2Cl_2$; they may be straight-chain or branched. Such thermoplastic polycarbonates are known from the literature or are preparable by methods known from the literature.

For the preparation of polycarbonates reference might be made, for example, to H. Schnell, "Chemistry and Physics of Polycarbonates", Polymer Reviews, Vol. 9, Interscience Publishers, New York, London, Sydney 1964, D. C. Prevorsek, B. T. Debona and Y. Kesten, Corporate Research Center, Allied Chemical Corporation, Morristown, N.J. 07960, "Synthesis of Poly(ester)carbonate Copolymers" in Journal of Polymer Science, Polymer Chemistry Edition, Vol. 19, 75–90 (1980), D. Freitag, U. Grigo, P. R. Müller, N. Nouvertne, BAYER AG, "Polycarbonates" in Encyclopedia of Polymer Science and Engineering, Vol. 11, second edition, 1988, pp. 648–718, and finally U. Grigo, K. Kircher and P. R. Müller "Polycarbonate" [Polycarbonates], in Becker/Braun, Kunststoff-Handbuch [Manual of Plastics], Vol. 3/1, Polycarbonate, Polyacetale, Polyester, Celluloseester [Polycarbonates, polyacetals, polyesters, cellulose esters], Carl Hanser Verlag, Munich, Vienna 1992, pp. 117–299. They are preferably prepared by the interfacial process, the pyridine process or the melt transesterification process.

Compounds to be preferably utilised as starting compounds for the preparation of polycarbonates are bisphenols corresponding to the general formula HO—Z—OH, in which Z is a bivalent organic radical having 6 to 30 carbon atoms which comprises one or more aromatic groups. Examples of such compounds are bisphenols belonging to the group comprising the dihydroxydiphenyls, bis(hydroxyphenyl)alkanes, bis(hydroxyphenyl)cycloalkanes, indane bisphenols, bis(hydroxyphenyl)sulfides, bis(hydroxyphenyl)ethers, bis(hydroxyphenyl)sulfones, bis(hydroxyphenyl)sulfoxides, bis(hydroxyphenyl)ketones and α,α'-bis(hydroxyphenyl)diisopropylbenzenes.

Preferred bisphenols belonging to the aforementioned groups of compounds are hydroquinone, resorcinol, 4,4'-dihydroxydiphenyl, bis(4-hydroxyphenyl)sulfide, bis(4-hydroxyphenyl)sulfone, bis(3,5-dimethyl-4-hydroxyphenyl) methane, bis(3,5-dimethyl-4-hydroxyphenyl)sulfone, 1,1-bis(3,5-dimethyl-4-hydroxyphenyl)-p/m-diisopropylbenzene, 1,1-bis(4-hydroxyphenyl)-1-phenyl ethane, 1,1-bis(3,5-dimethyl-4-hydroxyphenyl) cyclohexane, 1,1-bis(4-hydroxyphenyl)-3-methyl cyclohexane, 1,1-bis(4-hydroxyphenyl)-3,3-dimethyl cyclohexane, 1,1-bis(4-hydroxyphenyl)-4-methyl cyclohexane, 1,1-bis(4-hydroxyphenyl)cyclohexane, 1,1-bis (4-hydroxyphenyl)-3,3,5-trimethyl cyclohexane, 2,2-bis(3, 5-dichloro-4-hydroxyphenyl)propane, 2,2-bis(3-methyl-4-hydroxyphenyl)propane, 2,2-bis(3,5-dimethyl-4-hydroxyphenyl)propane, 2,2-bis(4-hydroxyphenyl)propane ("bisphenol A"), 2,2-bis(3-chloro-4-hydroxyphenyl) propane, 2,2-bis(3,5-dibromo-4-hydroxyphenyl)propane, 2,4-bis(4-hydroxyphenyl)-2-methyl butane, 2,4-bis(3,5-dimethyl-4-hydroxyphenyl)-2-methyl butane, α,α'-bis(4-hydroxyphenyl)-o-diisopropyl benzene, α,α'-bis(4-hydroxyphenyl)-m-diisopropyl benzene ("bisphenol M"), α,α'-bis(4-hydroxyphenyl)-p-diisopropyl benzene and indane bisphenol, as well as optionally mixtures thereof.

Particularly preferred polycarbonates are the homopolycarbonate based on bisphenol A, the homopolycarbonate based on 1,1-bis(4-hydroxyphenyl)-3,3,5-trimethyl cyclohexane and the copolycarbonates based on the monomers bisphenol A and 1,1-bis(4-hydroxyphenyl)-3,3,5-trimethyl cyclohexane.

The bisphenols to be utilised according to the invention are reacted with carbonic acid compounds, in particular phosgene.

Polyester carbonates are obtained by reacting the bisphenols already mentioned, at least one aromatic dicarboxylic acid and optionally carbonic acid. Suitable aromatic dicarboxylic acids are, for example, orthophthatic acid, terephthalic acid, isophthalic acid, 3,3'- or 4,4'-diphenyl dicarboxylic acid and benzophenone dicarboxylic acids. Up to 80 mol %, preferably approximately 20 to 50 mol %, of the carbonate groups in the polycarbonates may be replaced by aromatic dicarboxylic acid ester groups.

The average molecular weight $\overline{M}_w$ of the polycarbonates according to the invention can be adjusted in known manner by means of chain terminators. The chain terminators may be utilised in individual manner or as a mixture of different chain terminators.

Suitable chain terminators are, for example, monophenols and monocarboxylic acids. Suitable monophenols are, for example, phenol, p-chlorophenol, p-tert-butyl phenol, cumyl phenol or 2,4,6-tribromophenol as well as long-chain alkyl phenols such as 4-(1,1,3,3,-tetramethylbutyl)phenol or monoalkyl phenols or dialkyl phenols, respetively, having a total of 8 to 20 C atoms in the alkyl substituents, such as, for example, 3,5-di-tert.-butylphenol, p-tert.-octylphenol, p-dodecylphenol, 2-(3,5-dimethylheptyl)phenol or 4-(3,5-dimethylheptyl)phenol. Suitable monocarboxylic acids are for example benzoic acid, alkylbenzoic acids and halobenzoic acids.

Preferred chain terminators are phenol, p-tert.-butyl phenol, 4-(1,1,3,3-tetramethylbutyl)phenol and cumyl phenol.

The quantity of chain terminators is preferably between 0.25 and 10 mol %, in relation to the total of bisphenols used in each case.

The polycarbonates which are suitable according to the invention may be branched in known manner, specifically preferably by the incorporation of trifunctional or higher than trifunctional branching agents. Suitable branching agents are, for example, those such as have three or more phenolic groups or those such as have three or more carboxylic acid groups.

Suitable branching agents are, for example, phloroglucin, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tris-(4-hydroxyphenyl)ethane, tri(4-hydroxyphenyl)phenyl methane, 2,2-bis-[4,4-bis-(4-hydroxyphenyl)-cyclohexyl]propane, 2,4-bis-(4-hydroxyphenylisopropyl)phenol, 2,6bis-(2-hydroxy-5'-methylbenzyl)-4-methyl phenol, 2-(4-hydroxyphenyl)2-(2,4-dihydroxyphenyl)propane, hexa(4-(4-hydroxyphenylisopropyl)phenyl)terephthalic acid ester, tetra(4-hydroxyphenyl)methane, tetra(4-(4-hydroxyphenylisopropyl)phenoxy)methane and 1,4-bis-4',4''-dihydroxytriphenyl)methyl)benzene as well as 2,4-dihydroxybenzoic acid, trimesic acid, cyanuric chloride, 3,3-bis(3-methyl-4-hydroxyphenyl)-2-oxo-2,3-dihydroindole, trimesic acid trichloride and α,α',α''-tris-(4-hydroxyphenyl)-1,3,5-triisopropyl benzene.

Preferred branching agents are 1,1,1-tris-(4-hydroxyphenyl)ethane, 3,3-bis(3-methyl-4-hydroxyphenyl)-2-oxo-2,3-dihydroindole and isatin biscresol.

The quantity of the branching agents which are optionally to be utilised is preferably from 0.05 mol % to 2 mol %, in relation to moles of bisphenols utilised.

The branching agents may, for example if the polycarbonate is prepared by the interfacial process, be introduced as an initial charge with the bisphenols and the chain terminators in the aqueous alkaline phase, or they may be added dissolved in an organic solvent, together with the carbonic acid derivatives. In the case of the transesterification process the branching agents are preferably dispensed together with the dihydroxy aromatics or bisphenols.

In order to prepare the polycarbonates by the interfacial process the bisphenols are dissolved in an aqueous alkaline phase, preferably sodium hydroxide solution. The chain terminators which are optionally necessary for the preparation of copolycarbonates are dissolved, in quantities of from 1.0 to 20.0 mol % per mole bisphenol in the aqueous alkaline phase or are added without dissolution to the latter in an inert organic phase. Phosgene is then passed into the mixer containing the remaining reaction constituents, and the polymerisation is cared out. After the reaction the organic phase which comprises the polycarbonate is separated from the aqueous phase and washed several times, and the polycarbonate is then isolated.

Organic solvents which are usable in the interfacial process are, for example, dichloromethane, the various dichloroethanes and chloropropane compounds, chlorobenzene and chlorotoluene. Dichloromethane and mixtures of dichloromethane and chlorobenzene are preferably utilised.

In the interfacial process the reaction may be accelerated by catalysts such as tertiary amines, N-alkyl piperidines or onium salts. Tributylamine, triethylamine and N-ethyl piperidine are preferably used The moulding compositions according to the invention may furthermore comprise suitable additives such as mould release agents, UV absorbers, stabiliters, lubricants, antistatic agents, fillers and/or reinforcing materials, antioxidants, pigments, dyes, and finely divided minerals. The additives are incorporated into the amorphous thermoplastic polymer in known manner by mixing polymer granules with the additives, followed by extrusion, or by mixing the solutions of the polymer with solutions of the additives, followed by evaporation of the solvents in known manner. The additives content of the thermoplastic moulding composition may be varied within broad limits and is dictated by the desired properties of the moulding composition. The total additive content of the moulding composition is preferably from 0 to 20 wt. %, still more preferably 0 to 5 wt. %, in relation to the weight of the moulding composition.

Examples of mould release agents are calcium stearate, zinc stearate, glycerol monostearate and pentaerythritol tetrastearate; preferred mould release agents are glycerol monostearate and pentaerythritol tetrastearate.

UV absorbers may be added to the moulding compositions, in particular when these are used for the production of mouldings for the construction sector, such as windows or sheets. Suitable UV absorbers are compounds such as are able to afford polycarbonate effective protection from UV light owing to their absorption capacity below 400 nm, and such as have a molecular weight of more than 370, preferably 500 or more. Such UV absorbers are described in EP 0 500 496 A1, for example.

Suitable stabilisers for amorphous thermoplastic polymers are, for example, stabilisers which comprise phosphines, phosphites or silicon, as well as further compounds described in EP 0 500 496 A1. Triphenyl phosphites, diphenylalkyl phosphites, phenyldialkyl phosphites, tris (nonylphenyl)phosphite, tetrakis(2,4-di-tert.-butylphenyl)-4,4'-biphenylene diphosphonite and triphenyl phosphite might be named as examples.

Examples of lubricants are hydrocarbons (for example paraffin oils, polyethylene waxes), alcohols (for example stearyl alcohol), carboxylic acids (for example lauric acid, pahmitic acid, stearic acid), carboxylic acid amides (for example stearic acid amide, ethylenediamine bisstearyl amide), carboxylic acid esters (for example n-butyl stearate, stearyl stearate, glycerol monostearate, glycerol tristearate, pentaerythritol tetrastearate); preferred lubricants are carboxylic acid amides and carboxylic acid esters.

Examples of antistatic agents are cationic compounds (for example quaternary ammonium, phosphonium or sulfonium salts), anionic compounds (for example alkyl sulfonates, alkyl sulfates, alkyl phosphates, carboxylates in the form of alkali metal or alkaline earth metal salts), nonionic compounds (for example polyethylene glycol esters, polyethylene glycol ethers, fatty acid esters, ethoxylated fatty amines); preferred antistatic agents are nonionic compounds.

Preferred fillers are glass spheres, mica, silicates, quartz, talc, titanium dioxide or wollastonite. Preferred reinforcing materials are glass fibres or carbon fibres.

The moulding compositions according to the invention may be prepared by mixing the respective constituents in known manner and melt-compounding or melt-extruding in conventional units such as internal mixers, extruders and twin-screw units at temperatures of from approximately 200° C. to 330° C.

The individual constituents can be mixed in known manner in both successive and also simultaneous manner, specifically both at room temperature and also at elevated temperature.

The invention also provides moulded bodies produced with the moulding compositions according to the invention. The moulding compositions may be utilised for the manufacture of solid plastic sheets and so-called cellular sheets or multi-wall sheets (twin-wall sheets). These moulded bodies are produced by extrusion or co-extrusion. The sheets also include those such as have an additional outer layer on one side, which is embodied, for example, to be particularly weather-resistant. Mouldings such as housings of all kinds for electrical and mechanical apparatus such as domestic appliances like juice presses, coffee machines, mixers and office machines as well as mouldings for automotive construction can be obtained by injection moulding. Owing to their good electrical properties, the mouldings can moreover be utilised in the electrotechnical field. The moulded bodies may be produced in known manner by extrusion or injection moulding. Other moulded bodies which are furthermore considered are films.

The moulded bodies can furthermore be produced with the use of scrap (recycled product) from the moulding compositions according to the invention. For this purpose scrap such as housing waste or sheet waste made of the moulding composition according to the invention is comminuted in suitable manner, for example by shredders, and is then processed in known manner, either as such or with the admixture of non-recycled moulding composition, to produce moulded bodies.

The invention is further explained by means of embodiment Examples.

EXAMPLES a) Preparation of the Moulding Compositions

The polycarbonate moulding compositions indicated in Table 1 were prepared by extruding bisphenol A-based aromatic polycarbonate Makrolon® 2808, natural, from Bayer AG which has an average molecular weight ($M_w$ determined by GPC, PC standard) of 30,000, at 300° C. on a twin-screw extruder with the indicated quantities of additives, followed by granulation. Sachtoperse® HU-N Spezial from Sachtleben Chemie GmbH, 47184 Duisburg, was used as the barium sulfate. This had an average particle size of from 100 to 150 nm (incorporated in the polycarbonate by compounding). The particle size was determined by ultacentrifuging as described by Langer, H., "Particle and Particle Size Characterization", Vol. 12, p. 148, 1995. Glycerol monostearate (GMS) or pentaerythritol tetrastearate (PETS) was used as the mould release agent Hostaflon® (TF 2021) from Hoechst AG was utilised as the polytetrafluoroethylene. The granules were dried at from 100 to 120° C. in a vacuum drying cabinet.

TABLE 1

Composition of the moulding compositions

| Example | Polycarbonate wt. % | $C_4F_9SO_3K$ wt. % | $BaSO_4$ wt. % | GMS wt. % | PETS wt. % | Saccharine wt. % | Hostaflon® TF 2021 wt. % |
|---|---|---|---|---|---|---|---|
| 1 | 99.45 | 0.08 | — | — | — | — | — |
| 2 | 99.92 | 0.08 | — | — | 0.47 | — | — |
| 3 | 99.37 | 0.08 | 0.08 | — | 0.47 | — | — |
| 4 | 99.81 | 0.12 | 0.06 | 0.0003 | — | 0.0003 | — |
| 5 | 99.25 | 0.50 | 0.25 | 0.0012 | — | 0.0012 | — |
| 6 | 99.24 | 0.38 | 0.38 | 0.0019 | — | 0.0019 | — |
| 7 | 99.00 | 0.33 | 0.66 | 0.0034 | — | 0.0034 | — |
| 8 | 98.50 | 0.25 | 1.24 | 0.0062 | — | 0.0062 | — |
| 9 | 99.27 | 0.20 | — | — | 0.47 | — | 0.06 |
| 10 | 98.47 | 0.20 | 0.80 | — | 0.47 | — | 0.06 | b) Flame Retardancy Behaviour

The granules obtained in Examples 1 to 10 were injection moulded on an injection moulding machine at a melt temperature of 300° C. to form test bars having edges 127×12.7 mm long and layer thicknesses as indicated in Table 2. The test bars then underwent a flammability test in accordance with regulation UL-94 (Flammability of Solid Plastic Samples, Underwriters Laboratories, Northbrook, Ill., USA) and were allocated to UL-94 flammability classes V0, V1 and V2, or "Fail", respectively. A bar test in accordance with regulation UL-94 5V (Flammability of Solid Samples) was flrthermore carried out in respect of the moulding compositions prepared in Examples 9 and 10. The results of the flammability tests in respect of the moulding compositions of Examples 1 to 10 are shown in Table 2.

TABLE 2

Flame retardancy behaviour

| Example | Layer thickness | UL-94 test | UL-94 5 V bar test | UL-94 VTM |
|---|---|---|---|---|
| 1 | 3.2 mm | V0 | — | — |
|   | 2.6 mm | V0 | — | — |
|   | 2.4 mm | V0 | — | — |
| 2 | 3.2 mm | V0 | — | — |
|   | 2.6 mm | V1 | — | — |
|   | 2.4 mm | V2 | — | — |
| 3 | 3.2 mm | V0 | — | — |
|   | 2.6 mm | V0 | — | — |
|   | 2.4 mm | V0 | — | — |
| 4 | 0.25 mm | — | — | VTM 0 |

TABLE 2-continued

Flame retardancy behaviour

| Example | Layer thickness | UL-94 test | UL-94 5 V bar test | UL-94 VTM |
|---|---|---|---|---|
| 5 | 2.4 mm | V0 | — | — |
| 6 | 2.4 mm | V0 | — | — |
| 6 (recycled product) | 2.0 mm | V0 | — | — |
| 7 | 2.4 mm | V0 | — | — |
| 8 | 2.4 mm | V0 | — | — |
| 9 | 2.8 mm | — | Fail | — |
|   | 0.8 mm | V0 | — | — |
| 10 | 2.8 mm | — | Pass | — |
|   | 2.4 mm | — | Pass | — |
|   | 0.8 mm | V0 | — | — |
| 10 (recycled product) | 0.8 mm | V0 | — | — |

— = test not carried out

Examples 1 to 3 in Table 2 show that the addition of nanoscale barium sulfate in particular in the presence of mould release agents such as PETS has a markedly improved flame-retardant effect at a layer thickness of 2.4 mm.

The moulding composition prepared in Example 4 with the addition of potassium perfluorobutane sulfonate and barium sulfate in the presence of GMS as the mould release agent and saccharine shows an excellent flame retardancy behaviour, even after processing to a film 0.25 mm thick, and was classified into class VTM 0 following the UL-94 VTM flame impingement test (flammability of films). A further advantage of the films produced in Example 4 is their transparency.

Examples 5 to 8 in Table 2 furthermore show that the addition of nanoscale barium sulfate even in the presence of GMS as a mould release agent shows an excellent flame-retardant effect, and all these Examples were classified as V0 in accordance with UL-94, at a layer thickness of 2.4 nm.

Examples 5 and 6 show that the fire-retardant effect of potassium perfluorobutane sulfonate in conjunction with barium sulfate can be improved still further by the addition of fluorinated hydrocarbons such as Hostaflong® TF 2021. The moulding compositions of Examples 5 and 6 are classified into UL-94 flammability class V0 even at a layer thickness of 0.8 mm. Examples 5 and 6 furthermore show that the fire behaviour in accordance with the 5V bar test can be improved by the addition of nanoscale barium sulfate. Furthermore, the recycled products produced by shredding the moulding compositions according to Examples 6 and 10 and injection moulding them again pass the UL-94 test at a thickness of 2.0 or 0.8 mm, with the score V0 (see Table 2).

The notched impact strength of the moulding composition from Example 10 in accordance with ISO 180-4a at room temperature was around 90 kJ/m², both before and after recycling.

c) Transparency Behaviour

The transparency of the moulding compositions prepared in accordance with Examples 1 to 3 was determined in accordance with ASTM D 1003 regulation by means of the Haze-Gard Plus apparatus from Byk-Gardner GmbH, D-82538 Geretsried, Germany in respect of a layer thickness of 4 mm. The results of the transparency test are given in Table 3.

TABLE 3

Transparency behaviour

| Example | Layer thickness | Transmission in accordance with ASTM D 1003 |
|---|---|---|
| 1 | 4 mm | 92.8 |
| 2 | 4 mm | 93.0 |
| 3 | 4 mm | 90.6 |

The transparency tests show that the addition of nanoscale barium sulfate as a flame retardancy reinforcing agent in a quantity of 0.08 wt. %, in relation to the total weight of the moulding composition, has no appreciable influence on the transparency of the moulding compositions. With a transmission of 90.6 at a layer thickness of 4 mm, the moulding composition according to the invention from Example 3 has an excellent transparency profile.

What is claimed is:

1. A thermoplastic molding composition comprising:
   (a) an amorphous thermoplastic polymer;
   (b) at least one flame retardant represented by the general formula (I),

$$[R\text{—}SO_3]_n^- M^{n+} \quad (I)$$

in which
   R is a straight-chain or branched aliphatic radical having 1 to 30 carbon atoms or an aromatic radical having 6 to 30 carbon atoms,
   M is any cation, and
   n is a number corresponding to the valence of M; and
   (c) at least one member selected from the group consisting of,
   (i) an alkaline earth metal sulfate having an average particle size of up to 400 nm, and being selected from at least one member of the group consisting of $MgSO_4$, $SrSO_4$ and $BaSO_4$, and
   (ii) an oxide having an average particle size of up to 400 nm, and being selected from at least one member of the group consisting of $GeO_2$, $PbO$, $PbO_2$, $CeO_2$, $Ce_2O_3$, $SnO_2$, $ZrO_2$, $HfO_2$, $Sc_2O_3$ and $La_2O_3$.

2. The molding composition according to claim 1, wherein said alkaline earth metal and said oxide in each case has an average particle size of up to 200 nm.

3. The molding composition according to claim 1, wherein the quantity of the flame retardant is from 0.001 to 5.0 wt. % in relation to the total weight of the molding composition.

4. A process for the preparation of a molding composition according to claim 1, wherein said flame retardant, alkaline earth metal sulfate, oxide, and an optional fluorinated hydrocarbon are mixed with the amorphous thermoplastic polymer.

5. A molded body comprising the thermoplastic molding composition of claim 1.

6. A process for the production of a molded body according to claim 5, wherein the molding composition is processed by extrusion or injection molding to form molded bodies.

7. The composition of claim 1, wherein the flame retardant is at least partially halogenated.

8. The composition of claim 1, wherein the flame retardant is at least partially fluorinated.

9. The molding composition of claim 1, wherein the alkaline earth metal sulfate is barium sulfate.

10. The molding composition of claim 1, wherein the akaline earth metal sulfate and the oxide each independenty have an average particle size of approximately 5 to 40 nm.

11. The molding composition of claim 1, wherein at least one of the alkaline earth metal sulfate and the oxide are present in a quantity of from 0.001 to 2.0 wt. % in relation to the total weight of the composition.

12. The molding composition of claim 1, wherein the quantity of the flame retardant is from 0.05 to 0.5 wt. %, in relation to the total weight of the composition.

13. The molding composition of claim 1, further comprising polytetrafluoroethylene.

14. The molding composition of claim 13, wherein the quantity of the polytetrafluoroethylene is from 0.001 to 0.5 wt. % in relation to the total weight of the composition.

15. A molded article comprising the composition of claim 1.

* * * * *

UNITED STATES PATENT AND TRADEMARK OFFICE
CERTIFICATE OF CORRECTION

PATENT NO. : 6,740,697 B1 Page 1 of 1
DATED : May 25, 2004
INVENTOR(S) : Axel Brenner, Walter Kohler and Martin Dobler It is certified that error appears in the above-identified patent and that said Letters Patent is hereby corrected as shown below:

Column 16,
Line 43, insert -- SnO, --.

Signed and Sealed this

Sixteenth Day of November, 2004

JON W. DUDAS
*Director of the United States Patent and Trademark Office*